United States Patent [19]

Simon

[11] 4,252,911

[45] Feb. 24, 1981

[54] MASS POLYMERIZATION PROCESS FOR ABS POLYBLENDS

[75] Inventor: Robert H.M. Simon, Longmeadow, Mass.

[73] Assignee: Monsanto Company, St. Louis, Mo.

[21] Appl. No.: 85,556

[22] Filed: Oct. 17, 1979

[51] Int. Cl.³ .................... C08F 279/04; C08L 55/02
[52] U.S. Cl. .................................. 525/54; 525/53; 525/316
[58] Field of Search ............................. 525/53, 54, 316

[56] References Cited

U.S. PATENT DOCUMENTS

| | | | |
|---|---|---|---|
| 3,903,202 | 9/1975 | Carter et al. ............................ | 525/53 |
| 3,945,976 | 3/1976 | McCurdy et al. ....................... | 525/53 |
| 3,981,944 | 9/1976 | Okamoto et al. ....................... | 525/53 |
| 4,034,020 | 7/1977 | Moore et al. ........................... | 525/53 |

*Primary Examiner*—Carman J. Seccuro

*Attorney, Agent, or Firm*—Joseph S. Nelson; William J. Farrington; Edward P. Grattan

[57] ABSTRACT

The process relates to a continuous mass polymerization process for ABS polyblends wherein a monomer formulation of monoalkenyl aromatic and alkenyl nitrile monomers having a conjugated diene rubber dissolved therein is continuously charged to a first, stirred reaction zone operating at a steady conversion of said monomers of about 5 to 45% forming a partially polymerized first mixture having said rubber dispersed as grafted rubber particles, followed by continuously polymerizing said first mixture in a second stirred reaction zone by substantial linear flow polymerization under evaporative cooling of said monomers to a second partially polymerized mixture containing about 50 to 90% of ABS polyblend solids and separating said solids from said second mixture as an ABS polyblend.

21 Claims, No Drawings

MASS POLYMERIZATION PROCESS FOR ABS POLYBLENDS

BACKGROUND OF THE INVENTION

As is well known, polyblends of rubber with styrene/acrylonitrile polymers have significant advantages in providing compositions of desirable resistance to impact for many applications. Such polyblends are known as ABS polymeric polyblends having a matrix phase copolymer of monoalkenyl aromatic and alkenyl nitrile monomers having dispersed therein a conjugated diene rubber grafted with said monomers. Various processes have been suggested or utilized for the manufacture of such polyblends including emulsion, suspension and mass polymerization techniques and combinations thereof. Although graft blends of a monoalkenyl aromatic and alkenyl nitrile monomers and rubber prepared in mass exhibit desirable properties, this technique has a practical limitation upon the maximum degree of conversion of monomers to polymer which can be effected because of the high viscosities and accompanying power and equipment requirements, which are encountered when the reactions are carried beyond a fairly low degree of conversion after phase inversion takes place. As a result, techniques have been adopted wherein the initial polymerization is carried out in mass to a point of conversion beyond phase inversion at which the viscosity levels are still of practical magnitudes, after which the resulting prepolymerization syrup is suspended in water or other inert liquid and polymerization of the monomers carried to substantial completion.

N. E. Aubrey in U.S. Pat. No. 3,509,237 disclosed a mass/suspension method of polymerization styrene/acrylonitrile having diene rubbers dissolved therein with the rubber being grafted, inverted and dispersed as rubber particles under agitation. After phase inversion, the viscous mixture is suspended in water and polymerization is completed producing a polyblend in the form of beads.

Such mass/suspension processes are used commercially, however, present the economic problems of batch operations requiring long cycles at relatively low temperatures to control the heat of polymerization. Continuous mass polymerization processes have great economic advantages if they can be run at higher temperatures and higher rates with the necessary control of the great heats of polymerization. In the case of polyblends, the dispersed rubber phase must be formed and stabilized as to its morphology bringing it through the continuous polymerization of the rigid matrix polymer phase so that the physical properties of the polyblend meet exacting property specifications.

Various methods have been developed for the continuous mass polymerization of polyblends. Ruffing et.al., in U.S. Pat. No. 3,243,481 disclose a process wherein diene rubbers are dissolved in monovinylidene aromatic and alkenyl aromatic monomers and polymerized in four reaction zones. Such processes require physically separated reactors providing different reacting conditions for each step of polymerization involving costly multiple reactors and specialized equipment.

U.S. Pat. No. 3,337,650 discloses a continuous mass polymerization process for ABS polyblends wherein styrene and acrylonitrile monomers and a solvent having a diene rubber dissolved therein are continuously charged to a first back mixed stirred reactor operating at conversion of about 15 to 40% solids followed by further polymerization in a second back mixed reactor operating at 50 to 75% solids. Here, back-mixed stirred reactors running to high solids in the second reactor have the problem of handling the high viscosity experienced in large reactor processes. Because of the high viscosity, heat transfer also becomes a operational problem. Power and cooling problems require that such polymerization process, in large commercial operations, use solvents as diluents to reduce viscosity and aid temperature control. The use of solvents, in amounts of 15 to 20%, then creates the added problems of separating the ABS polyblend from the residual monomers and solvents and recycling such materials to the process on a controlled basis.

U.S. Pat. No. 3,511,895 discloses a process for the continuous polymerization of ABS polyblends wherein a styrene/acrylonitrile monomer solvent mixture is fed to a first back mixed reaction zone operating at least 20% conversion followed by a rubber/monomer solution providing a solids content of 25 to 50%, an effluent from the first reaction zone is fed to a second back mixed reaction zone operating at 55 to 70% solids and an effluent from the second reaction zone is fed to a third back mixed reaction zone operating at 70 to 90% solids with the ABS polyblend being separated from an effluent of the third reaction zone. This process is similar to that of U.S. Pat. No. 3,337,650 in that solvents or diluents are needed to reduce viscosity and control temperature.

There exists a need for a continuous mass polymerization process for ABS polyblends that can operate without solvents or diluents and with high conversion rates with a minimum number of reactors and low energy requirements. The towers and separate back-mixed reactors of the prior art used for the final polymerization in the range of 50 to 90% conversion have very low rates of polymerization, hence, require reactors that are substantially larger than the first reaction zone to provide the necessary hold-up time in the reactor to gain high conversion. Such systems have high energy requirements and relatively low polymerization efficiency.

It is the objective of the present invention to provide a process of high polymerization efficiency for ABS polyblends having superior properties.

It is also an objective of the present invention to provide a continuous purely mass polymerization process for ABS polyblends that can be operated to high conversion on a large scale without solvents or diluents for cooling and viscosity control.

SUMMARY OF THE INVENTION

The present invention relates to a continuous mass polymerization process for preparing an ABS polymeric polyblend having a matrix phase copolymer of monoalkenyl aromatic and alkenyl nitrile monomers and a dispersed conjugated diene rubber phase grafted with said monomers, the steps, being in the order set forth and consisting essentially of:

A. continuously charging a solution of said monomers having 2 to 15% of said rubber dissolved therein, to a first back mixed reaction zone, said first zone operating at 5 to 45% steady state conversion of said monomers, said rubber being dispersed as rubber particles having a particle size of about 0.5 to 10 microns, said particles having present about 1 to 5 parts of said monomers, wherein, at least a portion of said monomers is present as occluded and grafted copolymer of said monomers, forming a first partially polymerized mixture, B. continuously withdrawing and charging said first partially polymerized mixture to a second staged and stirred reaction zone, all said stages operating with common evaporative cooling by the evaporation of said monomers, said first mixture being progressively polymerized by substantially linear flow, steady state, polymerization through a plurality of stages in said second reaction zone forming a second partially polymerized mixture containing 50 to 80% of ABS polyblend solids, C. continuously withdrawing said second mixture from said second reaction zone and separating said ABS polyblend solids from said partially polymerized mixture as said ABS polyblend having a matrix phase copolymer of said monomers with a dispersed diene rubber phase as rubber particles having present grafted and occluded copolymer of said monomers in an amount of about 1 to 5 parts per part of rubber, said rubber particles having an average particle size of about 0.5 to 10 microns.

DETAILED DESCRIPTION

The Monomer Formulation

The monomer formulation comprises, at least principally, a monoalkenylaromatic monomer and an ethylenically unsaturated nitrile monomer. The monoalkenylaromatic monomer comprises at least one monomer of the formula:

where Ar is selected from the group consisting of phenyl, halophenyl, alkylphenyl and alkylhalophenyl and mixtures thereof and X is selected from the group consisting of hydrogen and an alkyl radical of less than three carbon atoms.

Exemplary of the monomers that can be employed in the present process are styrene; alpha-alkyl monovinylidene, monoaromatic compounds, e.g. alpha-methylstyrene, alpha-ethylstyrene, alpha-methylvinyltoluene, etc.; ring-substituted alkyl styrenes, e.g. vinyl toluene, o-ethylstyrene, p-ethylstyrene, 2,4-dimethylstyrene, etc.; ring-substituted halostyrenes, e.g. o-chlorostyrene, p-chlorostyrene, o-bromostyrene, 2,4-dichlorostyrene, etc.; ring-alkyl, ring-halo-substituted styrenes, e.g. 2-chloro-4-methylstyrene, 2,6-dichloro-4-methylstyrene, etc. If so desired, mixtures of such monovinylidene aromatic monomers may be employed.

Exemplary of the unsaturated nitriles or alkenyl nitrile monomers which may be used in the interpolymers are acrylonitrile, methacrylonitrile, ethacrylonitrile and mixtures thereof.

Exemplary of the monomers which may be interpolymerized with the monoalkenylaromatic hydrocarbons and unsaturated nitriles are conjugated 1,3-dienes, e.g. butadiene, isoprene, etc.; alpha- or beta-insaturated mono-basic acids and derivatives thereof, e.g. acrylic acid, methyl acrylate, ethyl acrylate, butyl acrylate, 2-ethylhexyl acrylate, methacrylic acid and the corresponding esters thereof, acrylamide, methacrylamide; vinyl halides such as vinyl chloride, vinyl bromide, etc.; vinylidene chloride, vinylidene bromide, etc.; vinyl esters such as vinyl acetate, vinyl propionate, etc.; dialkyl maleates or fumarates such as dimethyl maleate, diethyl maleate, dibutyl maleate, the maleic and fumaric anhydrides. As is known in the art, the amount of these comonomers which may be included in the interpolymer will vary as the result of various factors.

In addition, the monomer formulation at the time of polymerization may include a preformed polymer or a partially polymerized material such as a partially polymerized monoalkenylaromatic hydrocarbon or interpolymer thereof.

The polymerizable monomer mixtures contain at least 20% by weight of the monoalkenylaromatic monomer and preferable at least 50% by weight thereof. They also contain at least 5% by weight of the unsaturated nitrile and preferably at least 10% by weight thereof. From the standpoint of highly advantageous commercial practice, the monomer formulations contain 20 to 95% and preferably 60 to 85%, by weight of the vinylidene aromatic hydrocarbon and 80 to 5% and preferably 40 to 15% by weight of the unsaturated nitrile.

In addition to the monomers to be polymerized, the formulation can contain catalyst where required and other desirable components such as stabilizers, molecular weight regulators, etc.

The polymerization may be initiated by thermal monomeric free radicals, however, any free radical generating catalyst may be used in the practice of this invention including actinic irradiation. Conventional monomer-soluble peroxy and perazo catalysts may be used. Exemplary catalysts are di-tert-butyl peroxide, benzoyl peroxide, lauroyl peroxide, oleyl peroxide, toluyl peroxide, di-tert-butyl diperphthalate, tert-butyl peracetate, tert-butyl perbenzoate, dicumyl peroxide, tert-butyl peroxide isopropyl carbonate, 2,5-dimethyl-2,5-di(tert-butylperoxy) hexane, 2,5-dimethyl-2,5-di(tert-butylperoxy) hexane-3 or hexyne-3, tert-butyl hydroperoxide, cumene hydroperoxide, p-menthane hydroperoxide, cyclopentane hydroperoxide, pinane hydroperoxide, 2,5-dimethylhexane-2,5-dihydroperoxide, etc., and mixtures thereof.

The catalyst is generally included within the range of 0.001 to 3.0% by weight and preferably on the order of 0.005 to 1.0% by weight of the polymerizable material, depending primarily upon the monomer present.

As is well known, it is often desirable to incorporate molecular weight regulators such as mercaptans, halides and terpenes in relatively small percentages by weight, on the order of 0.001 to 1.0% by weight of the polymerizable material. In addition, it may be desirable to include relatively small amounts of antioxidants or stabilizers such as the conventional alkylated phenols. Alternatively, these may be added during or after polymerization. The formulation may also contain other additives such as plasticizers, lubricants, colorants and non-reactive preformed polymeric materials which are suitable or dispersible therein.

THE DIENE RUBBER

The preferred rubbers are diene rubbers, including mixtures of diene rubbers, i.e. any rubbery polymer (a rubbery polymer having a second order transition temperature not higher than 0° centigrade, preferably not higher than −20° centigrade, as determined by ASTM Test D-746-52T) of one or more of the conjugated, 1,3-dienes, e.g., butadiene, isoprene, 2-chloro-1,3 butadiene, 1 chloro-1,3 butadiene, piperylene, etc. Such rubbers include copolymers and block copolymers of conjugated 1,3-dienes with up to an equal amount by weight of one or more copolymerizable monoethylenically unsaturated monomers, such as monovinylidene aromatic hydrocarbons (e.g. styrene; an aralkylstyrene, such as the o-, m- and p-methylstyrenes, 2,4-dimethylstyrene, the arethylstyrenes, p-tert-butylstyrene, etc.; an alphamethylstyrene, alphaethylstyrene, alpha-methyl-p-methyl styrene, etc.; vinyl naphthalene, etc.); arhalo monovinylidene aromatic hydrocarbons (e.g. the o-, m- and p-chlorostyrene, 2,4-dibromostyrene, 2-methyl-4-chlorostyrene, etc.); acrylonitrile, methacrylonitrile; alkyl acrylates (e.g. methyl acrylate, butyl acrylate, 2-ethylhexyl acrylate, etc.), the corresponding alkyl methacrylates; acrylamides (e.g. acrylamide, methacrylamide, N-butylacrylamide, etc.); unsaturated ketones (e.g. vinyl methyl ketone, methyl isopropenyl ketone, etc.); alpha-olefins (e.g. ethylene, propylene, etc.); pyridines; vinyl esters (e.g. vinyl acetate, vinyl stearate, etc.); vinyl and vinylidene halides (e.g. the vinyl and vinylidene chlorides and vinylidene chlorides and bromides, etc.); and the like.

A preferred group of rubbers are the stereospecific polybutadiene rubbers formed by the polymerization of 1,3-butadiene. These rubbers have a cis-isomer content of about 30–98% and a trans-isomer content of about 70–2% and generally contain at least about 85% of polybutadiene formed by 1,4 addition with no more than about 15% by 1,2 addition. Mooney viscosities of the rubber (ML-4, 212° F.) can range from about 20 to 70 with a second order transition temperature of from about −50° C. to −105° C. as determined by ASTM Test D-746-52T.

The diene rubber used in preparing the first grafted diene rubber of step (A) is a soluble diene rubber of the type described above. The stereospecific polybutadiene rubbers are the most preferred for optimum physical properties of the polyblend.

The diene rubbers used in the diene grafted rubber is of the type described above. A preferred group of rubbers are those consisting essentially of 75 to 100% by weight of butadiene and/or isoprene and up to 25% by weight of a monomer selected from the group consisting of monovinylidene aromatic hydrocarbons (e.g. styrene) and unsaturated nitriles (e.g. acrylonitrile), or mixtures thereof. Particularly advantageous substrates are butadiene homopolymer or an interpolymer of 90 to 95% by weight butadiene and 5 to 10% by weight of acrylonitrile or styrene. The diene rubber may contain up to about 2% of a crosslinking agent based on the weight of the rubber monomer or monomers. The crosslinking agent can be any of the agents conventionally employed for crosslinking diene rubbers, e.g. divinylbenzene, diallyl maleate, diallyl fumarate diallyl adipate, allyl acrylate, allyl methacrylate, diacrylates and dimethacrylates or polyhydric alcohols, e.g. ethylene glycol dimethacrylate, etc.

CONTINUOUS MASS POLYMERIZATION-STEP A

A monomer formulation comprising at least principally a monoalkenyl aromatic monomer and an ethylenically unsaturated nitrile monomer having about 2 to 15% by weight of a diene rubber dissolved therein is charged continuously as a monomer-rubber solution to the initial reaction zone. The monomers are polymerized at temperatures of about 90°–150° C. in the first zone converting about 10–40% by weight of the monomers to a polymer as a copolymer. At least a portion of the polymer polymerized is grafted as copolymer molecules to the diene rubber as a superstrate.

Although the amount of polymeric superstrate grafted onto the rubber substrate may vary from as little as 10.0 parts by weight to 100.0 parts of substrate to as much as 250.0 per 100.0 parts and even higher, the preferred graft copolymers will generally have a superstrate to substrate ratio of about 20 to 200:100 and most desirably about 30 to 150:100. With graft ratios about 30 to 150:100, a highly desirable degree of improvement in various properties generally is obtained.

The remainder of the copolymer formed is dissolved in said monomer composition as polymerized forming a monomer-polymer solution. The monomer-polymer solution or phase is incompatible with the monomer-rubber solution or phase and phase separation is observed by the well known Dobry effect. As the polymer concentration of the monomer-polymer phase increases and has a volume slightly larger than the monomer-rubber phase, the monomer-rubber phase disperses as rubber-monomer particles aided by the shearing agitation of the stirred first reaction zone.

The agitation must be sufficient and of high enough shear to disperse and size the rubber particles uniformly throughout the monomer-polymer phase. The intensity of the stirring will vary with the size and geometry of the initial reactor, however, simple experimentation with a given stirred reactor will establish the sufficient amount of stirring needed to insure the homogeneous dispersion of the rubber particles throughout the monomer-polymer phase. The particle size of the rubber can be varied from a weight average particle diameter of from about 0.5 to 10 microns preferably from 0.7 to 5 microns to provide a balance between the impact strength and the gloss of the rubber reinforced polyblend. Higher stirring rates and shearing agitation can lower the size of the dispersed rubber particle, hence, must be controlled to provide sufficient stirring to size the particles to the predetermined size needed and insure homogeneous dispersion.

At steady state polymerization, in the initial polymerization zone, the continuously charged monomer composition containing 2.0 to 15% by weight diene rubber disperses almost instantaneously, under stirring, forming the rubber-monomer particles which on complete polymerization form discrete rubber particles. The conversion of monomers to polymers in the first reaction zone is controlled between 10–40% and must have a weight percent level that provides a polymer content in excess of the rubber content of the monomer composition to insure the dispersion of the monomer-rubber phase to a rubber-monomer particle phase having a predetermined size and being dispersed uniformly throughout the monomer-polymer phase.

The rubber particles becomes grafted with a first polymer in the first reaction zone which aids its dispersion and stabilizes the morphology of the particle. During the dispersion of the rubber-monomer particles, some monomer-polymer phase is occluded within the particle. The total amount of occluded monomer-polymer phase and grafted polymer present in the particles can be from about 1 to 5 parts for each part of said diene rubber.

The dispersed rubber phase increases the toughness of the ABS type polymeric polyblend as measured by is Izod impact strength by Test ASTM D-256-56. It has been found that the impact strength of polyblends increase with the weight percent rubber dispersed in the polyblend as used in the present invention. The impact strength is also determined by the size of the dispersed rubber particles, with the larger particles providing higher impact strength in the range of 0.5 to 10 microns measured as a weight average particle size diameter with a photosedimentometer by the published procedure of Graves, M. J. et.al., "Size Analysis of Subsieve Powders Using a Centrifugal Photosedimentometer," British Chemical Engineering 9:742-744 (1964). A Model 3000 Particle Size Analyzer from Martin Sweets Co., 3131 West Market Street, Louisville, Ky. was used.

The weight average diameter of the rubber particles also affects gloss with smaller particles giving high gloss and the larger particles giving low gloss to the fabricated polyblend article such as a molding or sheet product. One must balance impact strength and gloss requirements in selecting an optimum rubber particle size. The range of 0.5 to 10 microns can be used for the rubber particles with the range of 0.7 to 5 microns being preferred and 0.8 to 3 microns being most preferred for optimum impact and strength and gloss.

Processwise, in the initial reactor, one must (1) form and disperse the rubber particle, and (2) graft and stabilize the rubber particle maintaining its size and morphology or structure. The amount of occluded monomer-polymer phase described above is held at a predetermined level described above by steady state polymerization wherein the monomer is converted to polymer, at least a portion of which, grafts to the rubber stabilizing the rubber particle. It has been found that the higher the amount of occlusion stabilized within the rubber particle the more efficiently the rubber phase is used in toughening the polyblend. The rubber particle acts must as a pure rubber particle if the occlusions are controlled at the amount described above during their stabilization in the initial reaction zone and throughout the total polymerization process. The rubber particle is also grafted externally, stabilizing its structure as to size and its dispersability in the monomer-polymer phase. The initial reactor forms a first partially polymerized mixture of a monomer-polymer phase having the rubber phase described dispersed therein.

SECOND ZONE POLYMERIZATION OF STEP (B)

The mass polymerization of the first partially polymerized mixture can be carried out by continuous mass polymerization. Preferably, step (B) of the present invention is carried out thermally or with free radical catalysis continuous mass polymerization.

The mass polymerization reaction of step (B) can be controlled by varying the nature and amounts of the feed streams into step (A) and/or step (B) and the conditions thereof to produce the desired ABS polyblend. As is well known, it is often desirable to incorporate molecular weight regulators or chain transfer agents into the monomer formulation in relatively small quantities. Such chain transfer agents as mercaptans, halides and terpenes can be added in amounts of from 0.001 to 2.0% by weight if desired.

The second partially polymerized mixture of step (B) is continuously subjected to one or more stages of devolatilization to remove the remaining unreacted monomers. Such devolatilization is conducted in known manner in any desired devolatilizers, either of the wiped film or falling strand type. The devolatilization treatment is generally conducted at temperatures of from about 140° to 280° C. at reduced pressures of from 0.01 to 800 mmHg absolute, preferably at from about 180° to 250° C. and a pressure of from 2 to 200 mmHg abs. The second partially polymerized mixture can be preheated before devolatilization to reach the devolatilization temperatures desired by passing through a conventional tube and shell heat exchanger or the like. The product of the devolatilization stage is the polyblend composition substantially freed of free of unreacted monomer or monomers. Such free of residual monomer level is reduced to less than 1.0% by weight and desirably to less than 0.4% by weight.

After removal of the devolatilized polyblend from the devolatilization stage generally in the form of a melt it is formed into strands or other shapes by the use of stranding dies or other conventional means and thereafter cooled, cut or pelleted into the desired final size and stored or packaged for shipment. The final operations can all be conducted in conventional manner through the use of known equipment and devices.

Preferably, step (B) is carried out in a staged isobaric stirred reaction zone as a second reaction zone as disclosed in U.S. Pat. No. 3,927,983. The first partially polymerized mixture is polymerized by progressive multistage substantially linear flow polymerization, all said stages operating with shearing agitation and common evaporation vapor phase cooling under isobaric conditions in said second reaction zone, providing each said stage with steady state polymerization at controlled temperature and interfacial liquid contact stage to stage establishing a hydraulic pressure gradient from the first stage downstream to the final stage causing substantially linear flow through said second zone, all said stages operating at predetermined conversion levels producing a composite polymer as a second polymer in said second reaction zone having a predetermined molecular weight distribution and average molecular weight maintaining the structural integrity of said dispersed rubber particle, said second zone producing a second partially polymerized mixture having a total polymer content being determined by said multistage steady state polymerization and evaporation of said monomers.

The reactor operates under controlled isobaric conditions. The range of temperatures normally of interest for polymerizing monomer formulations comprising at least principally of monoalkenylaromatic and ethylenically unsaturated nitrile monomers in step (B) are from 110° to 180° C. The operating pressure will range from 10 to 200 psia. The polymerization reaction is exothermic and cooling is provided primarily by vaporization of a part of the monomer from the reacting mass. Further cooling can be provided by reactor jackets. Cooling by the condensed recycle monomer feeding into the second reaction zone is also provided. The mass is in a boiling condition and temperature is determined by the natural relationship between vapor pressure and boiling point. This relationship is also a function of the relative amounts of polymer, monomer, dissolved rubber. Since, as material progresses through this reactor, the amount of polymer continuously increases and the amount of monomer corresponding decreases via polymerization and monomer content further decreases due to vaporization loss, the temperature progressively increases from inlet to outlet stages. To accommodate the natural swell of the boiling mass and to provide space for vapor disengagement, the reactor is usually run at fillage of about 15 to 90%, preferably, 40 to 75% of its volume.

Monomer vapor passes out of the reactor to an external condenser where it is condensed and may also be subcooled. This condensate may then be handled in several ways, for example:

1. The condensate may be returned to at least one of the staged reaction zones.
2. The condensate may be returned to the inlet compartment of the staged reaction zone and mixed with the incoming first partially polymerized reaction mixture.

In a multi-compartment staged reaction zone, each stage is well mixed and the reaction mass is substantially homogeneous within itself. Baffles are used to separate the stages discouraging backflow of material between compartments. Clearance between the baffles and the reactor wall does permit the necessary forwarding of material through the compartments from reactor inlet to outlet giving substantially linear flow.

In a substantially horizontal compartmented staged reactor as here described, the first stage has a relatively low conversion level, since it is being continuously fed by the first partially polymerized mixture of step (A). However, the rate of conversion in this stage is relatively high because of the high concentration of monomer.

In each succeeding stage, the conversion level is higher than in the preceding one, which tends to lower the rate of conversion. Offsetting this effect, however, are the facts that the temperature is higher and that monomer is being vaporized out of the polymerizing second mixture. Thus, the total conversion to polymer obtained per unit fillage volume of the staged reactor is higher than that which could be obtained in a single stage reactor producing an equal final conversion level at equal temperature.

Clearances between rotating or stationary baffles acting as compartment baffles and cylindrical wall may be from 1 to 10% of reactor radius, the larger values being appropriate to the high conversion end of the reactor where viscosity is at maximum. Stage to stage forward flow of the polymerizing mixture is through this clearance and vapor from the polymerizing mixture also counterflows through the clearance, above the surface level of the polymerizing second mixture.

As described above the second partially polymerized mixture is polymerized by progressive multistage substantial linear flow polymerizations with the conversion of the monomer formulation advancing from about 10–40% conversion in the first stage to 50 to 80% conversion in the final stage of the staged isobaric stirred reaction zone as a second zone. This provides a gradual progressive increase of polymer in the monomer-polymer phase. This has been found to be important in maintaining the morphology or structure of the dispersed rubber-monomer particles.

In the initial reaction zone as the first grafted rubber particle is formed, the rubber particle has a monomer content that corresponds to the monomer content of the monomer-polymer phase. The rubber-monomer particle will stabilize at this level as the monomer polymerizes inside the rubber particle and grafted polymer is formed on the outside. Hence, the lower the level of conversion or polymer in the monomer-polymer phase of the initial reactor the higher the amount of monomer found in the rubber-monomer particles formed as the rubber solution is charged and dispersed in the monomer-polymer phase. Conversely, if the conversion is high in the initial stage, less monomer is occluded in the rubber phase particle on dispersion. The first mixture is polymerized in the staged linear flow second zone and the percent by weight of polymer being formed is progressively higher with each stage having a slightly higher polymer content. The staged linear progressive polymerization not only controls the polymerization of the monomer giving desirable polymers but was found unexpectedly to preserve the integrity of the rubber particles. Although not completely understood, as the first grafted rubber particle becomes grafted and the monomer-polymer phase forms in the occluded monomer of the rubber particle, the monomer is not readily extracted from the rubber particle by the monomer-polymer phase as the polymer content increases gradually in the monomer-polymer phase during polymerizing in the staged reactor. It is thought that since the polymerization in the multistaged linear reaction zone is so gradual that polymer is being formed in both the first grafted rubber particle and the monomer-polymer phase at about the same rate, hence, the total polymer content of the occluded monomer-polymer phase of the first grafted rubber particle is about the same as polymer content of the monomer-polymer phase and monomer is not extracted, hence, the weight percent of occlusion is stabilized and remains substantially constant after formation in the initial reactor.

THE MATRIX PHASE OF THE POLYBLEND

In the present invention, the monomer formulation comprising at least principally a monoalkenylaromatic monomer and an ethylenically unsaturated nitrile monomer will polymerize readily to form polymers of the matrix phase in the presence of a dispersed rubber phase. Such polymers can be called copolymers or if another monomer is present in the formulation, terpolymers. The polymer is formed in step (A) as a free polymer or the matrix phase in the first partially polymerized mixture with at least a portion of said polymer grafted to the diene rubber forming the first grafted diene rubber.

Depending on the proportions of each monomer in the monomer formulation these polymers will have different compositions with the free polymer and the grafted polymers having about the same composition for a given formulation. It is well known that styrene and acrylonitrile monomers copolymerize in varying proportions. A monomer formulation having about 76 parts styrene and about 24 parts acylonitrile, e.g., will polymerize by mass polymerization with reflux of monomers to produce a polymer of this composition at any conversion because the monomers in these proportions form an azeotrope. By definition then the azeotropic composition is the composition wherein the polymer being formed is the same as that of the unpolymerized monomer formulation. It is known that proportions other than the azeotrope above of the two monomers can be used to produce polymers of uniform composition. Basdekis, C. H., "ABS Plastics", Reinhold, N.Y., 1964, describes methods of producing ABS polyblends having styrene/acrylonitrile S/AN matrix polymers of uniform composition using monomer formulations other than the azeotropic S/AN composition of 76/24. Muller, R. G., "ABS Resins", Report No. 20, Stanford Research Institute, Menlo Park, Ca., also describes processes for the production of ABS polyblends having uniform SAN matrix polymers. In such copolymerization, one monomer tends to enter the polymer molecule faster than the other monomer because of their differences in reactivity. As the conversion of the monomer formulation progresses one monomer is depleted faster than the other and the monomer composition changes with conversion. The SAN matrix phase having uniform monomer composition can be produced by using (a) the azeotropic monomer formulation; (b) by keeping the monomer formulation in the reactor uniform by adjusting the proportions of the monomers charged and by (c) limiting the level of conversion so that the differential polymerization rate does not have a material effect on composition. It has been found practical in preparing uniform matrix polymers, e.g. that the 76/24 S/AN formulation can be run to about 100% conversion. The 70/30 S/AN formulation to about 75% conversion, the 35/65 S/AN and the 90/10 S/AN formulations to about 30 to 40% conversion. In mass polymerization of S/AN monomer formulations, the viscosity of the partially polymerized mixtures increase with conversion forming melts which are difficult to mix for heat transfer and homogeneity, hence, conversions greater than 70 to 80% are limiting in step (B) of the second reaction zone.

The present process, then, can produce a wide range of ABS products with varying amounts of grafted rubber and matrix polymers having a wide range of monomer compositions. In addition, the two polymerization steps provide the capability of producing matrix polymers have a wide range of average molecular weights and molecular weight distributions. It is known that in thermal or catalytic polymerization that the molecular weight of the polymers can be predetermined by polymerizing at different temperatures. The lower the temperature the higher the molecular weight and conversely the higher the temperature the lower molecular weight. Step (A) is normally run at a lower temperature of 90° to 150° C. producing a first polymer having an average molecular weight of 75,000 to 200,000 Staudinger whereas step (B) is normally run at higher temperatures of 110° to 180° C. to produce a composite polymer having an average molecular weight of 20,000 to 100,000 Staudinger. By adjusting the temperature of the two reaction zones, a wide variety of matrix polymers and graft polymers can be produced to provide a final polymer with the average molecular weight desired including the molecular weight distribution desired.

As described, it is preferred to run step (B) in a staged isobaric, stirred reaction zone that has an increasing temperature for each stage producing a composite polymer in step (B) with the average moelcular weight described.

Preferably, the final polymer of the matrix phase produced by the present invention has a dispersion index ($M_w/M_n$), wherein $M_w$ is the weight average molecular weight and $M_n$ is the number average molecular weight ranging from about 2.0 to 4.0, most preferably from 2.2 to 3.5. The dispersion index is well known to those skilled in the art and represents the molecular weight distribution with the lower values having narrow molecular weight distribution and higher values having broader molecular weight distributions. The average molecular weight of the combined polymer of the matrix phase preferable range from 40,000 to 150,000 Staudinger.

The rubbers can be analyzed for graft and occlusions along with swelling index by the well known gel tests. The first or second grafted rubber copolymers is dispersed in tetrahydrofuran (1 g/10 ml) which dissolves the polymer leaving the dispersed rubber as a gel phase. The rubber phase is separated from the dispersion by centrifuge as a gel and dried in a vacuum oven at 50° C. for 12 hours and weighed as a dry gel.

$$\text{\% Dry gel in Polyblend} = \frac{\text{Weight of dry gel}}{\text{Weight of polyblend}} \times 100$$

$$\left.\begin{array}{l}\text{\% Graft and}\\ \text{Occlusions}\\ \text{in Rubber}\end{array}\right\} = \frac{\text{\% dry gel} - \text{\% rubber}}{\text{Percent rubber*}} \times 100$$

$$\left.\begin{array}{l}\text{Parts by weight}\\ \text{of graft polymer}\\ \text{and occluded poly-}\\ \text{mer per unit weight}\\ \text{of rubber}\end{array}\right\} = \frac{\text{\% dry gel} - \text{\% rubber}}{\text{Percent rubber}}$$

*Percent rubber determined by infra-red spectro-chemical analysis of the dry gel The swelling index of the diene grafted rubber can range from 3 to 30, preferably 5 to 20, most preferably the swelling index of the diene grafted rubber can range from 7 to 15.

The swelling index of the rubber graft particles is determined by taking the dry gel above and dispersing it in tetrahydrofuran for 12 hours. The gel is separated by centrifuge and the supernatant toluene drained free. The wet gel is weighed and then dried in a vacuum oven for 12 hours at 50° C. and weighed.

$$\text{Swelling Index} = \frac{\text{weight of wet gel}}{\text{weight of dry gel}}$$

The following examples are set forth to illustrate more clearly the principles and practice of this invention to one skilled in the art. They are not intended to be restrictive but merely illustrative of the invention herein described.

EXAMPLE 1

Continuous Process for ABS Polymeric Polyblends

A monomer formulation comprising 5 parts by weight of stereospecific polybutadiene rubber in 95 parts by weight of a 75/25 styrene/acrylonitrile monomers is prepared by agitating the mixture of finely cut rubber and monomer at 40° C. for 8 hours. The rubber used contains approximately 35% cis-1,4 structure; approximately 55% trans-1,4 structure and approximately 10% vinyl-1,2 structure having a Mooney viscosity of the rubber (ML-4, 212° F.) at 35 (the rubber is commercially available from the Firestone Rubber Co., Akron, Ohio under the trade name (Diene 35) and 0.1 part by weight of octadecyl 3-(3',5'-di-tertbutyl-4-hydroxyphenyl) propionate. This monomer formulation is fed continuously at approximately 145 lbs./hr. along with terpinolene at 0.145 lbs./hr. (0.1%) to a 100-gal. anchor-agitated initial reactor operated at approximately 50% fillage of the monomer formulation and 100° C. under 10 psig. nitrogen pressure. The agitator is approximately 31 inches wide and turns at 65 rpm. A first partially polymerized mixture containing approximately 18% SAN is pumped from the above reactor after steady state polymerization is reached at a continuous rate such as to maintain essentially constant fillage therein.

The first partially polymerized mixture is fed continuously to the second reactor, a staged isobaric stirred reactor. The second reactor has approximately a 50 gal. capacity and operates at about 40% fillage. The reactor is about 53 inches long. The agitator consists of a horizontal shaft on which are fixed a series of paddles about 2 inches wide alternating at right angles to one another. Along the shaft and rotating with it are four circular discs with an average radial wall clearance of about ⅜ inch rotating at 15 rpm. These discs are positioned to divide the reactor into five stages of approximately equal volume. The pressure in this reactor is maintained at approximately 55 psia. The second partially polymerized mixture in the final stage is maintained at about 160° C. and contains about 60 weight percent of SAN after passing through five stages, along with 5 weight percent of rubber and 35 weight percent of monomer.

The styrene/acrylonitrile vapors evaporated from the second reactor are condensed and the condensate is returned to the first compartment. The evaporated monomers have a ratio of styrene to acrylontrile of 30/70. The composition of the vapor phase is brought into substantial equilibrium with the composition of the liquid phase under steady state polymerization and reflux by acrylonitrile addition. The second partially polymerized mixture is pumped continuously from the final stage at a rate to maintain essentially constant fillage in the second reactor.

The second partially polymerized mixture which is delivered to the inlet of a tube and shell heat exchanger preheater. The third partially polymerized mixture exits from the preheater at approximately 240° C. and enters a devolatilizer chamber maintained at 50 torr. The devolatilized melt is fed from the devolatilizer chamber to an extruder which forms it into a plurality of strands which are then cooled and cut into pellets.

It is to be noted that the first reactor was run at 124° C. and the second reactor at about 160° C. with the first reactor making a higher average molecular weight first polymer and the second reactor making a lower average molecular weight second polymer. The preheater of the separator step was run at 240° C. causing crosslinking of the first rubber phase giving the rubber phase a swelling index 9. The combined SAN polymers of the rigid phase is found to have an average molecular weight of about 90,000 Staudinger and a dispersion index of 3.1 representative of the molecular weight distribution. The grafted rubber particles have a desirable morphology having a particle size of 1.5 microns and having a graft and occlusion level to rubber ratio of 1.70 to 1.0.

EXAMPLE 2

Back Mixed Second Reaction Zone

Example 1 was repeated using a single stage stirred tank reactor of the type disclosed in U.S. Pat. No. 3,813,369. The second reactor was run to a fillage of about 340 lbs. to reach the same level of conversion (60%) as with the staged reactor which is about twice the fillage needed in the staged reactor meaning that the conversion rate of the stirred tank is only about 50% of the staged reactor. The ABS polyblend had a rubber particle size of 1.2 microns and a graft and occlusion level of about 0.91. This example demonstrates the superiority of using a staged second reaction zone in that higher levels of graft and occlusions are obtained providing greater rubber efficiency for toughening the polyblend along with greater polymerization efficiency. The ABS polyblends of Examples 1 and 2 were tested for toughness with the Izod impact strength test ASTM D-256. The impact strength of ABS for Example 1 was found to be 1.5 ft.lbs. on ½" by ⅛" molded specimens whereas Example 2 was only 0.8 ft.lbs.

What is claimed is:
1. A continuous mass polymerization process for preparing an ABS polymeric polyblend having a matrix phase copolymer of monoalkenyl aromatic and alkenyl nitrile monomers and a dispersed conjugated diene rubber phase grafted with said monomers, the steps, being in the order set forth and consisting essentially of:
   A. continuously charging a solution of a monomer mixture containing at least 20% by weight of the monalkemylaromatic monomer and at least 5% by weight of the alkenyl nutrile monomer having 2 to 15% of said rubber dissolved therein, to a first back mixed reaction zone, said first zone operating at 5 to 45% steady state conversion of said monomers, said rubber being dispersed as rubber particles having a particle size of about 0.5 to 10 microns, said particles having present about 1 to 5 parts of said monomers, wherein, at least a portion of said monomers is present as occluded and grafted copolymer of said monomers, forming a first partially polymerized mixture,
   B. continuously withdrawing and charging said first partially polymerized mixture to a second staged and stirred reaction zone, all said stages operating with common evaporative cooling by the evaporation of said monomers, said first mixture being progressively polymerized by substantially linear flow, steady state, polymerization through a plurality of stages in said second reaction zone forming a second partially polymerized mixture continuing 50 to 80% of ABS polyblend solids,
   C. continuously withdrawing said second mixture from said second reaction zone and separating said ABS polyblend solids from said partially polymerized mixture as said ABS polyblend having a matrix phase copolymer of said monomers with a dispersed diene rubber phase as rubber particles having present grafted and occluded copolymer of said monomers in an amount of about 1 to 5 parts per part of rubber, said rubber particles having an average particle size of about 0.5 to 10 microns.

2. A process of claim 1 wherein said monoalkenylaromatic monomer is styrene, said alkenyl nitrile monomer is acrylonitrile and said diene rubber polybutadiene.

3. A process of claim 1 wherein said monoalkenylaromatic monomer is styrene.

4. A process of claim 1 wherein said alkenyl nitrile monomer is acrylonitrile.

5. A process of claim 1 wherein said diene rubber is a polymer of butadiene, butadiene-styrene, butadiene-acrylonitrile, butadiene-styrene-acrylonitrile, chloroprene, chloroprene-butadiene, chloroprene-styrene, chloroprene-acrylonitrile, chloroprene-styrene-acrylonitrile and mixtures thereof.

6. A process of claim 1 wherein the diene rubber contains at least 50% by weight of a conjugated 1,3 butadiene monomer moiety.

7. A process of claim 1 wherein said soluble diene rubber is polybutadiene having a cis isomer content of about 30 to 98% and a Tg range of from about −50° C. to −105° C.

8. A process of claim 1 wherein said grafted rubber of said ABS polyblend having a swelling index of about 3 to 30.

9. A process of claim 1 wherein the copolymer formed has an average molecular weight of from about 40,000 to 150,000 Staudinger.

10. A process of claim 1 wherein the polymerization of step (A) is conducted at temperatures of about 90° to 150° C.

11. A process of claim 1 wherein the polymerization of step (A) and (B) is carried out having present about 0.001 to 3.0 percent by weight of a free radical generating catalyst.

12. A process of claim 1 wherein said free radical generating catalyst is selected from the group consisting of di-tert-butyl peroxide, tert-butyl peracetate, benzoyl peroxide, lauroyl peroxide, tert-butyl perbenzoate, dicumyl peroxide, tert-butyl peroxide and isopropyl carbonate or mixtures thereof.

13. A process of claim 12 wherein said free radical generating catalyst is tert-butyl peracetate.

14. A process of claim 12 wherein said free radical generating catalyst is di-tert-butyl-peroxide.

15. A process of claim 1 wherein the continuous mass polymerization of step (B) is conducted at temperatures of 110° to 180° C.

16. A process of claim 1 wherein the polymerization of step (B) is controlled thermally by evaporating and removal of said monomers under isobaric conditions and shearing agitation.

17. A process of claim 16 wherein the evaporated and removed monomers are liquified and returned to the polymerizing partially polymerized second mixture at a rate such that steady state polymerization is maintained.

18. A process of claim 16 wherein the polymerization of step (B) is conducted progressively under substantially linear flow through 2–15 polymerization states, said stages operating under substantially constant gravimetric fillage of from about 15 to 90% of their volume of said polymerizing second partially polymerized mixture.

19. A process of claim 16 wherein the evaporated and removed monomers are liquified and returned to at least one polymerization stage at a rate such that steady state polymerization is maintained.

20. A process of claim 16 wherein the evaporated and removed monomers are liquified and returned to the first polymerization stage.

21. A process of claim 1 wherein said separation of step (C) is carried out at temperatures of about 180° to 250° C. under a subatmospheric pressure.

* * * * *